2,855,940

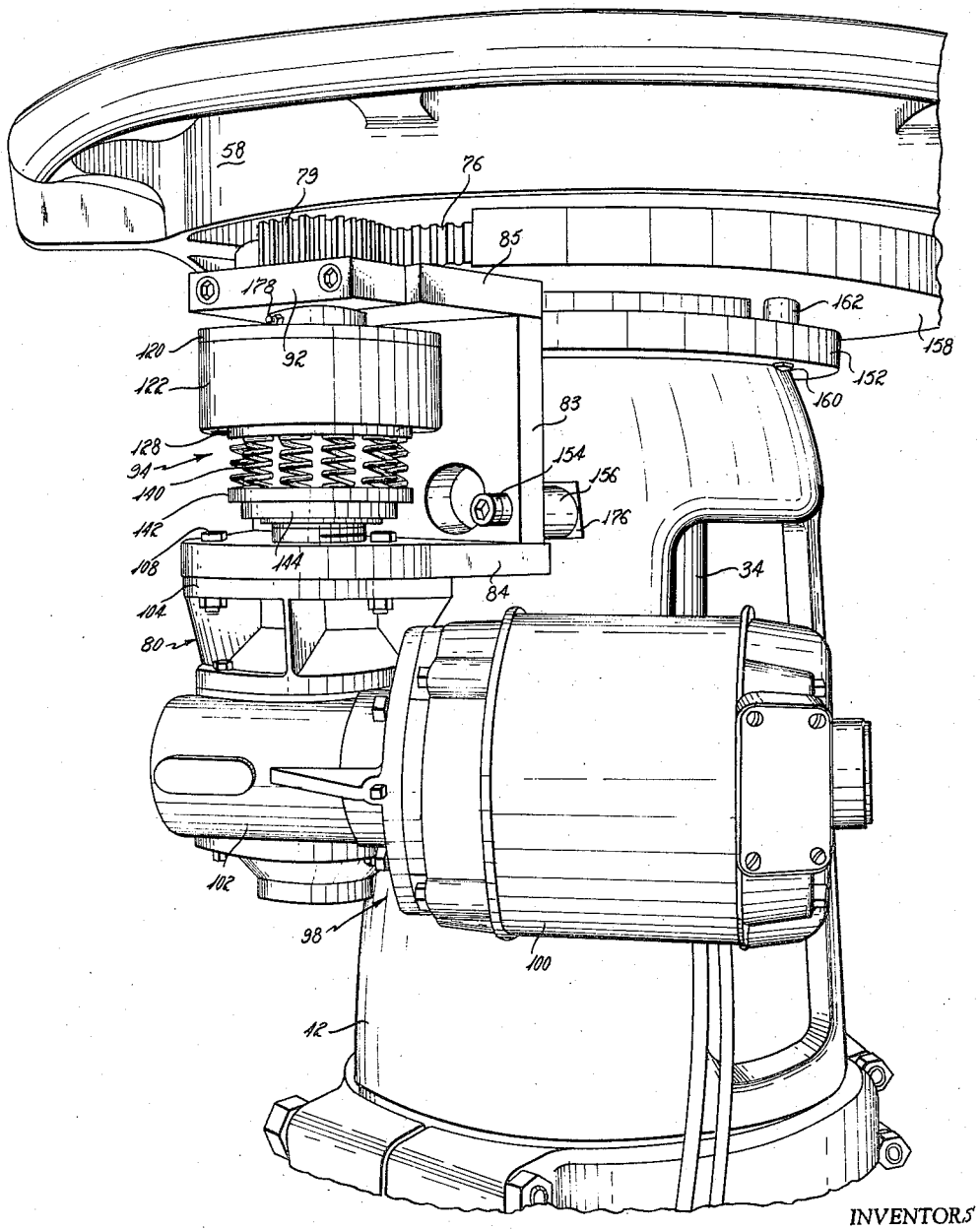

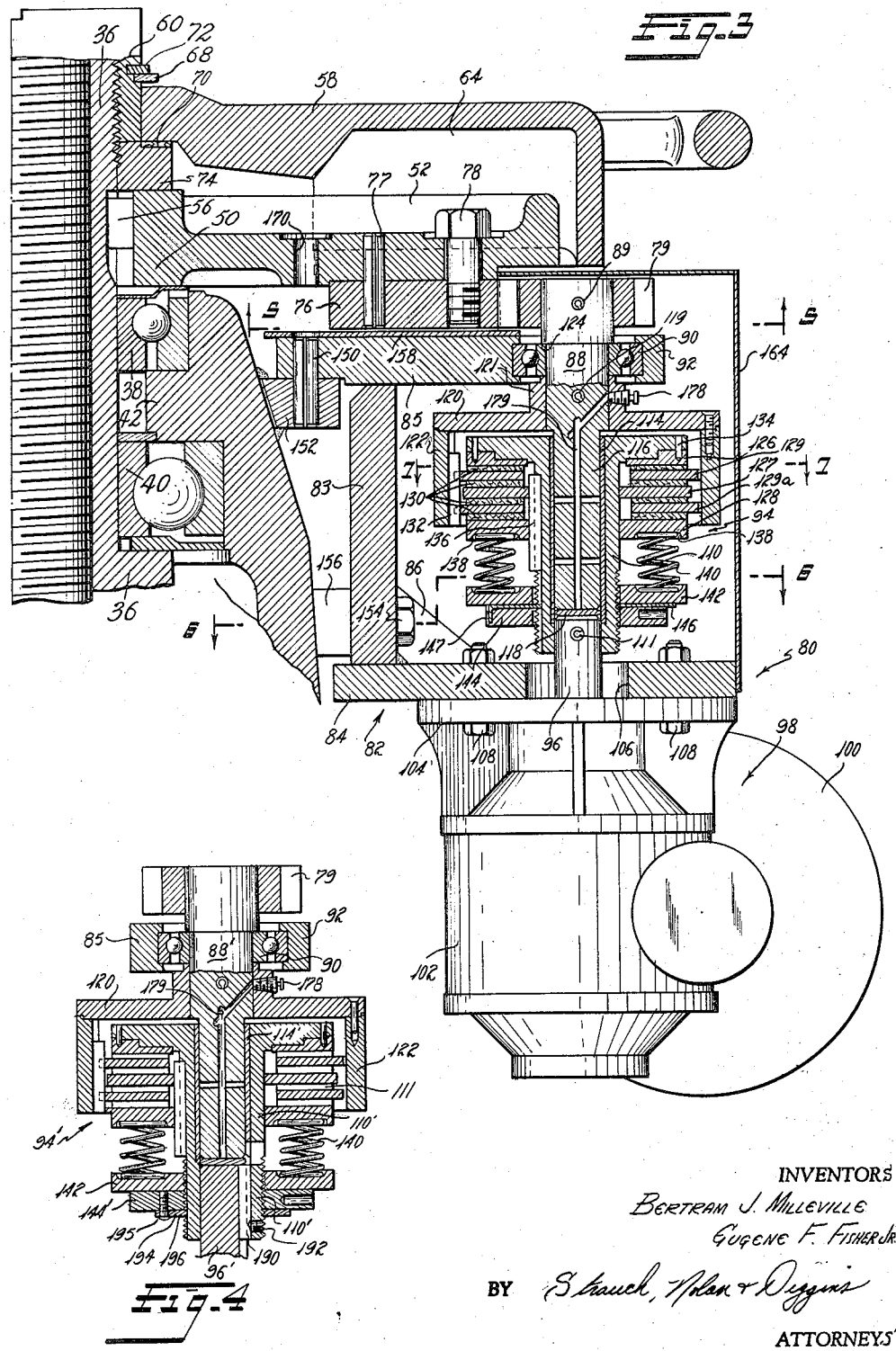

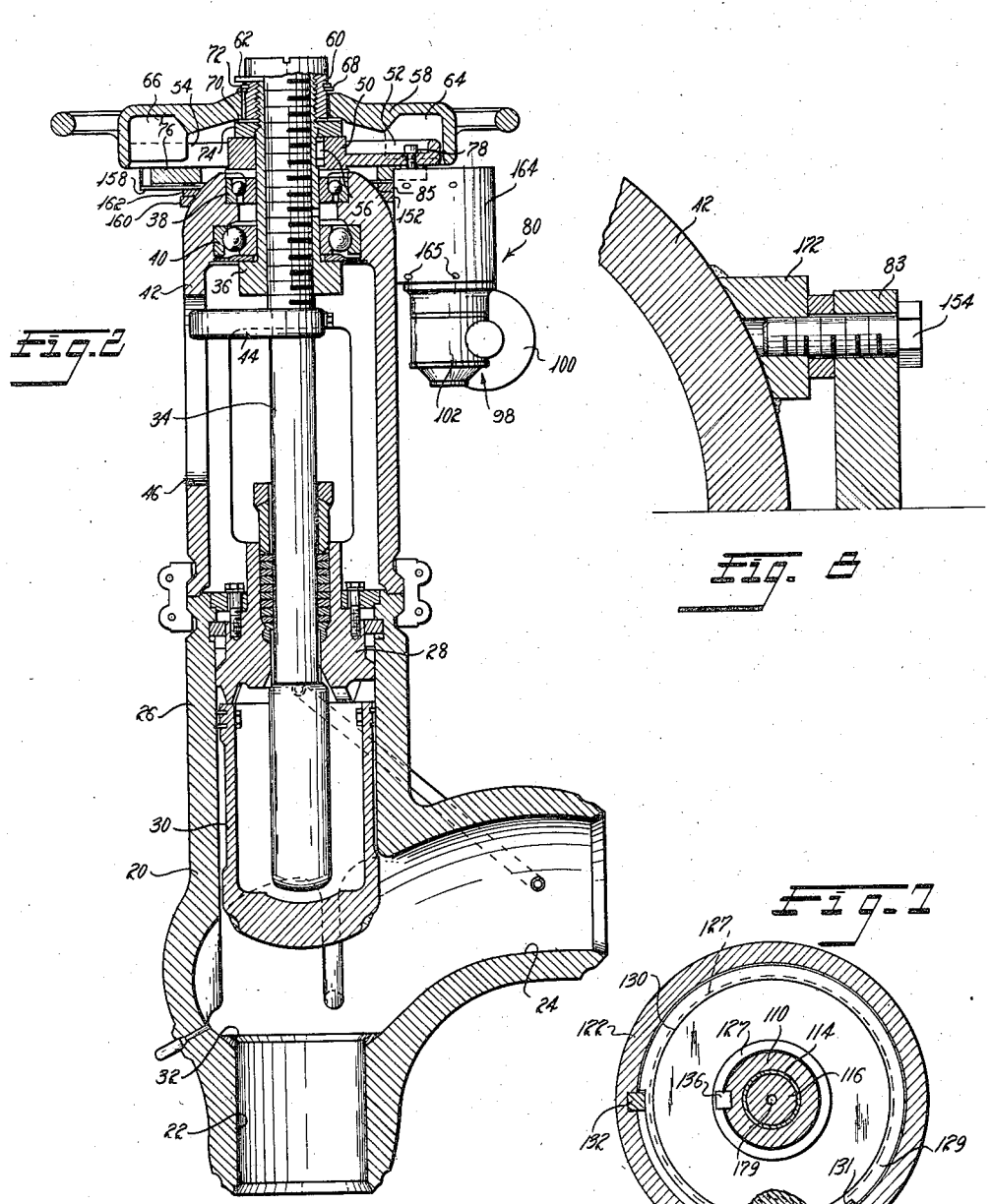

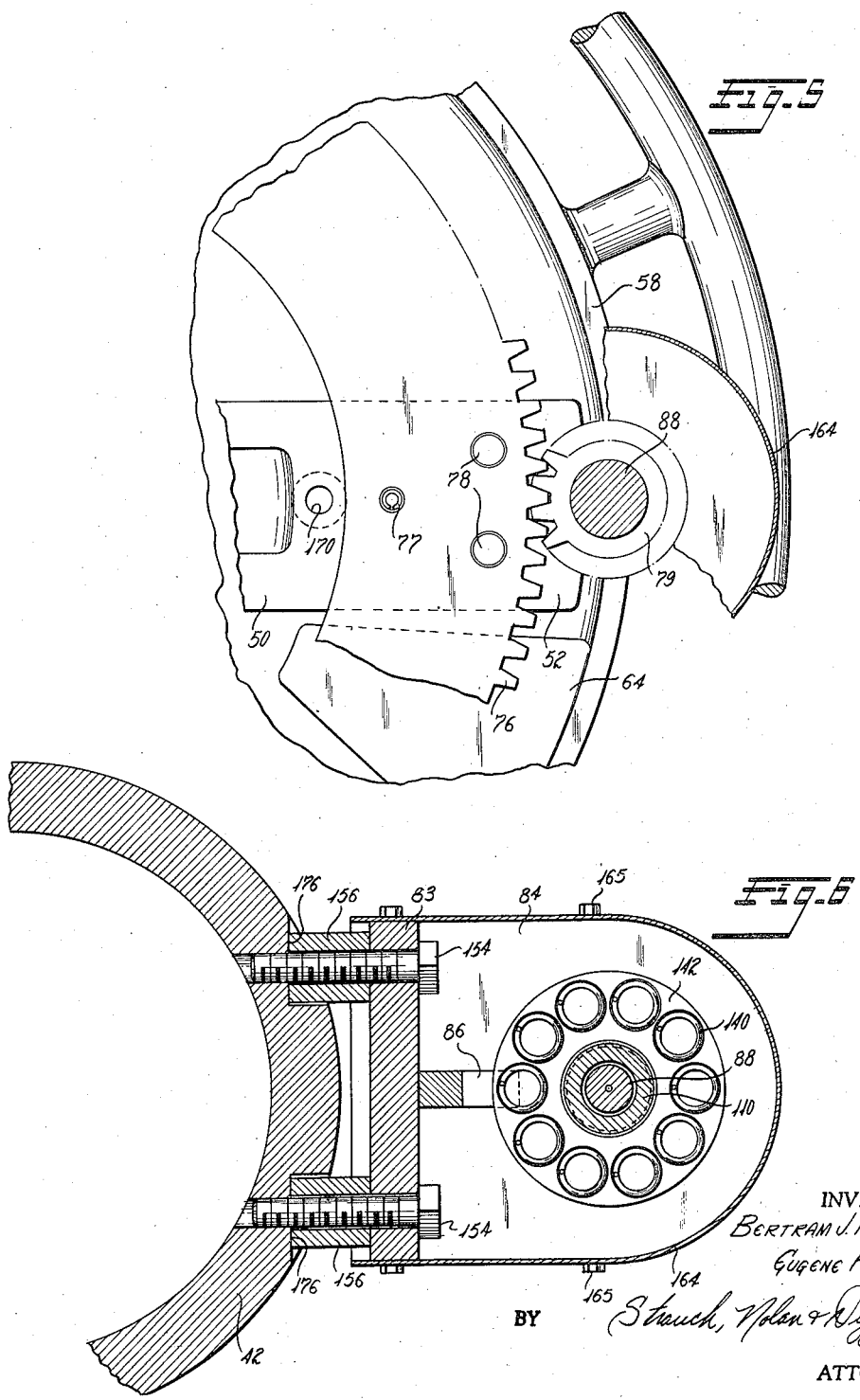

VALVE OPERATING METHODS

Bertram J. Milleville, Homewood, Ill., and Eugene F. Fisher, Jr., Hammond, Ind., assignors, by mesne assignments, to Edward Valves, Inc., East Chicago, Ind., a corporation of Delaware Application September 13, 1955, Serial No. 533,933

4 Claims. (Cl. 137—1)

This invention relates to methods of valve operation and more particularly to methods for moving the closure elements of valves, adapted for high temperature, high pressure service, between open and closed positions.

While the principles of the present invention may be applied to most valves operated by a screw-thread actuated stem, the invention will be disclosed herein as applied to a valve of the type shown in United States Patent 2,665,874, adapted for high pressure, high temperature service since this valve typifies units with which the unique advantages of the present invention are best realized.

Such valves are used to control the flow of fluids at pressures up to 3000 p. s. i. and higher and are often very large. For example, a typical valve may have a closure element twelve inches in diameter, a stem four inches in diameter and the closure may be moved as much as twelve inches between full open and full closed positions. Conventionally such valves are opened or closed by rotation of a threaded stem or a threaded stem support and consequently high operating torques must be developed to move the valve toward open and closed position.

In valves of the gate and globe type the major forces opposing stem travel are produced by the internal fluid pressure and the friction developed between the stem and the stem packing. The resistance to stem travel is approximately equal to the product of the area of the stem cross section at the stuffing box and the internal pressure in the valve plus friction developed between the packing and the stem during the time the valve is moved from the open to the seated position. At the time of seating, the resistance to stem travel is considerably increased. In the case of globe valves the resistance may rise to a figure approximately equal to or in excess of the product of the seat area multiplied by the line pressure.

Valves of moderate size for handling fluids under moderate pressure are conventionally equipped with a simple handwheel directly connected to the stem or stem operator and in such cases the torque required to move the valve closure (25 ft.-lbs., for example) may be supplied by one man by rotating the handwheel through many revolutions. The torque for tight seating is in the order of ten times as large (250 ft.-lbs., for example) but since it is exerted ordinarily only through approximately half a turn of the handwheel it can be supplied by increased effort or by extension bars which double or triple the mechanical advantage of the wheel. However, as the sizes and operating pressures are increased, the torque required to move the stem and to effect tight seating exceeds the torque which can be developed by one man or even by several men through a conventional handwheel.

For example, a twelve inch valve controlling a fluid under a pressure of 2000 p. s. i., with a stem having a three inch diameter at the stuffing box, has a stem resistance in the neighborhood of 16,500 pounds of which the stem-packing friction constitutes approximately 2500 pounds. With conventional operating structure a steady pull in the neighborhood of 300 to 500 pounds must be exerted on the rim of a 24 inch diameter hand wheel while it is turned forty-eight revolutions. This is considerably in excess of the force which can be reasonably applied by one man. If gearing is introduced into the system the force can be decreased but the total number of turns is correspondingly increased so that the effort required remains above that which can be conveniently applied. When a valve of this type is seated, the stem load may increase to approximately 200,000 pounds for a globe valve or 80,000 pounds for a gate valve. If a conventional handwheel is used, a rim force of 3000 pounds may be required to tightly seat a globe valve and 1000 pounds to seat a gate valve.

The increasing importance of valves of this type in industry has inspired a number of efforts to provide apparatus for reducing the manual effort required to operate the valves.

A partial solution to the general problem was provided by the impact imparting handwheel disclosed in United States Patent 1,731,314 which has been in widespread use for many years. A handwheel of this type is incorporated in the aforesaid United States Patent 2,665,874. While the cost of the impact imparting handwheel is quite moderate and it successfully applies a high torque through a fraction of a revolution and provides tight seating even in large, high pressure valves, it is not an efficient device for applying forces in the order of 300 to 500 pounds for the large number of full revolutions needed to turn a large valve down from the full open to the full closed position.

It has also been proposed to add gearing in the valve stem actuating system and apparatus of this type is widely available. However, the total number of turns of the handwheel required when such gearing is used is very large and the total work performed by the operator is actually greater than with a simple handwheel because of the added friction in the gearing system.

Other attempted solutions to the problem are in the use of power means such as electric or pneumatic motors for operating the valves. Such motors are widely used and are satisfactory, however, to provide the proper power required for tightly seating the valve closure member at the end of the closing operation, high powered motors must be used. Due to the initial cost of such high powered motors, which must be power rated approximately 10 times or more higher than a motor that need furnish power only to turn the stem between open and closed positions and not to tightly seat the valve, such an insallation may increase the cost of a large high pressure gate or globe valve by as much as 50%.

This invention uses a motor with sufficient power only to operate the valve closure member during the major portion of travel in combination with an impact imparting handwheel to furnish the force necessary to make the final tight closure of the valve. Thus the power rating and cost of the motor and associated transmission is considerably lower than that for a motor with sufficient power to furnish the final effort for a full tight valve closure.

In the preferred embodiment, illustrated in the drawings, a gear reduction drive, including a special friction clutch, connects an electric motor and the cross arm assembly of an impact imparting handwheel type of valve operator. When the valve has been closed by the motor to a position where the frictional drag on the threaded shaft becomes excessive, the friction clutch slips while maintaining a predetermined closing force on the valve cross arm assembly. The final tight valve seating can then be accomplished through use of the impact imparting handwheel in conjunction with the predetermined torque applied by the motor through the slipping friction clutch. In the preferred embodiment provision is made to protect the motor and the power train connecting the motor and cross-arm assembly from damage due to high instantaneous loads developed during impacting. Preferably this is accomplished by incorporating a lost motion connection in the power train between the cross arm assembly and the friction clutch.

Accordingly a major object of the present invention is to provide a valve operating method which affords a practical, commercially feasible solution to the problem in the industry of providing a rapid, easy and positive operation of valves without unduly increasing the cost and weight of valves and their operating mechanism.

A still further object resides in the provision of a novel powered valve operating method wherein a power operator is used only to furnish the power necessary for initial valve closing movement and an impact imparting handwheel is used in conjunction with the power operator to accomplish the final valve closure.

A further object resides in a novel method of closing a high pressure valve comprising the steps of initially closing the valve solely by the application of a constant torque of predetermined value and accomplishing final closing movement by supplementing said constant torque intermittently by additional torque.

A still further object resides in a novel method of opening a high pressure valve comprising the steps of initially opening the valve by combined constant torque application and supplemental incremental torque completing the valve opening solely by constant torque application.

Further novel features and objects of this invention will become apparent from the following detailed description and the appended claims taken in conjunction with the accompanying drawings showing a preferred embodiment thereof in which:

Figure 1 is a perspective view of the preferred embodiment of the power actuator of this invention mounted on the yoke of a reciprocable stem valve, with the clutch and pinion safety cover removed;

Figure 2 is a partially sectional elevation view of the valve shown in Figure 1;

Figure 3 is an enlarged vertical section view of the upper portion of the valve and power actuator shown in Figure 2, taken on a plane through the clutch axis and the valve stem axis;

Figure 4 is a detail section of a modified clutch and shaft connection;

Figure 5 is a section view taken on line 5—5 of Figure 3 looking at the bottom of the valve handwheel and showing the drive pinion, ring gear and cross arm;

Figure 6 is a section view taken on line 6—6 of Figure 3 showing the clutch pressure plate, the lower support plate and the frame attachment by bolts to the valve yoke;

Figure 7 is a section view taken on line 7—7 of Figure 3 illustrating details of the clutch plates; and Figure 8 is a detail section view showing a modified means of attaching the power unit frame to the valve yoke.

Referring now more particularly to the drawings, the valve shown in Figure 2 is of the angle-non-return type. However, it is to be understood that this type of valve is shown by way of illustration only and the invention may be applied with equal effect to other types of stem operated valves including stop valves, gate valves and other forms of globe valves.

The principal elements of the valve structure shown in Figures 1 and 2 are the body 20 having inlet and outlet passages 22 and 24 respectively, and a tubular extension 26 in which a bonnet 28 is received. The valve closure member 30 slidably received in the tubular extension 26 cooperates with a seat 32 to control the passage of fluids through the valve. The closure member may be moved toward the seat by gravity, by the fluid flowing through the valve, or may be positively moved toward closed position by a stem 34 threaded at its upper end into a yoke bushing 36 rotatably mounted by suitable thrust bearings 38 and 40 mounted in the yoke 42. Since rotary movement of the stem 34 is prevented by a guide arm 44 rigidly secured to the stem and having its outer end extending through a slot 46 in the yoke, rotation of the bushing 36 will produce axial movement of the stem.

Situated above the bearing structure, a cross arm assembly 50 having opposite radially extending arms 52 and 54 is secured to the yoke bushing 36 by a key 56. A relatively heavy handwheel 58 is rotatably mounted on a bearing adapter 60 threaded onto the upper end of the yoke bushing 36 and held in place after assembly by a pin 62. The handwheel 58 is provided with lugs or hammers 64 and 66 adapted to engage the outer ends or anvils of radial arms 52 and 54, respectively. Accordingly a steady pull applied to the handwheel will, through abutment of lugs 64 and 66 with arms 52 and 54, rotate the cross arm assembly 50 and yoke bushing 36 to move the valve stem 34 axially. When additional torque is required to accomplish full seating of the valve, the handwheel 58 may be backed off and rotated rapidly through part of a revolution so the lugs 64 and 66 strike the ends of the arms 52 and 54, creating by impact a relatively high torque on the cross arm assembly 50. Several such impacts are effective to move the valve to a final tight seating position. The hand wheel 58 is positioned between upper and lower bearing washers 68 and 70 respectively, which bear respectively against a retaining ring 72 and a bearing collar 74.

The basic structure thus far described is disclosed in the aforesaid Patent 2,665,874 to which reference may be made for a more detailed description. It is a feature of the invention that the novel actuator now to be described may be incorporated in such valves with only minor modification and, in combination with the conventional structure affords rapid, easy and positive operation of the valve.

It is to be understood that the actuator of the present invention, considered in its entirety, thus includes elements of the conventional manual actuator above described. As stated above the invention includes a power actuated gear train connected directly to the cross arm assembly which receives the impact from the handwheel to apply an operating torque to the stem independently of the torque applied by the impact imparting handwheel.

Power is transmitted to the cross arm assembly 50 through a ring gear 76 accurately located by shear pins 77 and coaxially fastened to the underside of the two cross arms 52 and 54 by machine screws 78. Pins 77 absorb the force transmitted between the gear 76 and the cross arm 50 and each pin may consist of a single spring type pin although a double concentric spring type pin is preferable to provide greater resistance to shearing under normal impactor operation.

The ring gear 76 is in meshed engagement with the driven pinion 79 of a power unit 80, which is rigidly mounted in a support frame 82 accurately located and fastened on the valve yoke 42, in a manner to be later described. Support frame is an integrally welded unit with a heavy base plate 83, an end plate 84 and a bearing spacer plate 85, the end plate 84 and spacer plate 85 being parallel and at opposite ends of base plate 83. Gussets 86 may be welded at the joint between end plate 84 and base plate 83 to provide added strength.

The pinion gear 79 is fastened on the end of a stub shaft 88 by a spring type shear pin 89, the shaft 88 being vertically journalled in a bearing 90 retained in the bearing spacer plate 85, by a bearing cap 92. The stub shaft 88 connects, through a friction clutch 94, to the output shaft 96 of a drive unit 98, consisting of a combined reversible electric motor 100 and high ratio worm type speed reduction transmission 102. The housing of motor 100 and transmission 102 are fastened together as a unit and mounted on the support frame end plate 84 by the transmission housing mounting flange 104 and bolts 108. The drive output shaft 96 projects vertically through housing flange 104 and through an aperture 106 in end plate 84, and is coaxially aligned with stub shaft 88, parallel with base plate 83 and perpendicular to the end plate 84 and spacer plate 85. Using the worm gear reduction transmission 102, as illustrated, the motor axis will be horizontal. However, by using other known arrangements of high ratio speed reducing transmissions (not shown) the motor axis can be arranged in any desired position. The motor unit may be electric, pneumatic or hydraulic and is to be equipped with conventional reversing controls (not shown).

Clutch 94 is preferably an adjustable multiple disk friction clutch incorporating a lost motion connection. However it will be apparent that other suitable torque-limiting clutches may be used in lieu of the type disclosed. Clutch 94 includes a flanged driving sleeve 110 fastened closely adjacent the end of drive shaft 96 by roll pin 111. The extension of sleeve 110 beyond the end of shaft 96 is counterbored and receives a bronze bearing sleeve 114 that in turn receives and journals the lower end 116 of stub shaft 88. A bronze spacer disk 118 is disposed between the adjacent ends of the stub shaft 88 and drive shaft 96 to provide a bearing surface for relative rotation of the two shafts. This arrangement, with spring type pin 111 fastening sleeve 110 to drive shaft 96, permits a maximum length for stub shaft 88, and provides a large bearing surface in sleeve 114. It is desirable to maintain the distance between the point of average side load in bearing sleeve 114 and the bearing plate 85 as great as possible to provide a long moment arm for the bearing load which counteracts the gear tooth load on stub shaft 88.

The driven element 120 of clutch 94 has a central sleeve 121, fixed by a spring type pin 119 to the stub shaft 88, and a cylindrical flange 122 surrounding and extending below the flanged portion of sleeve 110. Central sleeve 121 abuts the lower side of bearing 90 and a shoulder 124 on stub shaft 88 abuts the upper side of the bearing to maintain the stub shaft in fixed axial position.

Although the number of clutch disks may vary depending upon the installation, the illustrated embodiment has three driving disks 126, 127 and 128 and two driven disks 129 and 129a. The driven disks have a clutch facing 130, of asbestos based composition or the like, bonded to each side face. Each disk 129 and 129a has sector shaped open key slots 131 and 131a that cooperate with a key 132 welded on the inner surface of the cylindrical sleeve 122 so the disks can shift axially relative to the sleeve. The sector key slots 131 and 131a which are preferably of different length, as described in detail hereinafter, permit lost motion upon reversal of one of the clutch parts. The uppermost driving disk 126 abuts and is fixed to the flange of driving sleeve 110 by pins 134, providing an axially fixed abutment surface. The remaining two driving disks 127 and 128 engage a key 136 fixed by welding to the keyway in driving sleeve 110 and are free to shift axially relative to the sleeve. The lower surface of disk 128 has a plurality of circumferentially arranged recesses 138 retaining the upper ends of an equal number of compression springs 140 whose lower ends are retained in similar recesses in a pressure plate 142, identical to the disk 128 except it need have no keyway. Pressure plate 142 is adjustable axially on the driving sleeve 110, for varying the compression of springs 140 to thereby adjust the maximum torque output of clutch 94. Adjustment is accomplished by a nut 144 threaded on the lower end of sleeve 110, a lock washer 146 engages the sleeve keyway and maintains the position of nut 144 by a bent tab 147, thereby locking the clutch adjustment.

Figure 4 illustrates an alternative embodiment of the clutch connections between the motor shaft 96′ and the pinion stub shaft 88′. Motor shaft 96′ is longer than in the previously described embodiment and is drivingly connected to the clutch driving sleeve 110′ by a key 190 and set screws 192. As this connection necessitates a longer portion of motor shaft 96′ disposed within clutch sleeve 110′, a shorter extent of stub shaft 88′ is journalled within the bearing sleeve 114′ in clutch sleeve 110′. Thus the moment arm between the location of average side load on bearing sleeve 114′ and bearing 90′ is shorter than in the previous embodiment, resulting in higher proportional bearing wear in this embodiment. Although this second embodiment is satisfactory, particularly for use with smaller valves, the previously described embodiment is preferred. A further difference exists in the use of a lock washer 194 fastened to adjusting nut 144′ by a screw 195 and having an inner lug 196 cooperating with the clutch sleeve keyway, to lock the nut 144′ after the clutch is properly adjusted.

In each of the embodiments a grease fitting 178 in the driven clutch element 122 with properly drilled lubricant passages 179 in the stub shaft 88 or 88′ provides means for lubricating shaft 88 and bearing members 114 and 118 which have relative rotation whenever the clutch slips.

Support frame 82 is fastened to the valve yoke 42 at three points. A single spring type pin 150 passes through aligned apertures in spacer plate 85 and a prelocated mounting ring or saddle 152 welded to the upper extremity of the yoke 42. Two bolts 154 pass through the lower portion of the base plate 83, through spacers 156 and are fastened in the yoke body. The power unit is thus rigidly mounted on the valve with pinion 79 and cross arm ring gear 76 in meshed engagement. The ring gear cover 158, which is shown in Figures 1 and 2 is supported above the mounting ring 152 by bolts 160 and spacers 162. Pinion gear 79 and clutch 94 are enclosed by a cover member 164 that fits over the frame 82, abuts the yoke 42 and is fastened to the edges of the frame plates by screws 165.

As mentioned above the power operator may readily be incorporated on existing manually operable valve assemblies. To install the power unit as added equipment on existing valves the ring gear 76 is accurately coaxially disposed and fastened on the cross arm assembly 50. Opposed suspension holes 170 are accurately drilled or otherwise provided in opposite ends 52 and 54 of the cross arm. As illustrated in Figure 3, the inner diameter of the mounting ring is such as to provide a slight clearance relative to the yoke surface when located in correct position. Assembled location is obtained by suspending the mounting ring 152 from the cross arm (52 and 54) by bolts and spacer sleeves of predetermined length. In suspended position, ring 152 will be positioned so the pinion gear 79 of an attached power unit will mesh with the cross arm ring gear 76. The mounting ring 152 is then welded to the yoke 42 and the suspension bolts and spacers removed. The power unit frame is then placed in position and roll pin 150 inserted.

The holes for bolts 154 can be located, drilled and tapped in the yoke 42. In a field installation spacers 156 may be individually fitted to properly space the support frame back plate 83 from the yoke 42 prior to bolting. Alternatively, threaded blocks 172 as shown in Figure 8 may be welded to the yoke 42 instead of machining, drilling and tapping the yoke. In factory installations the yoke casting can be premachined (Figure 6) with flat surfaces at 176 and standard size spacers 156 used in the installation of frame 82. The pinion 79, stub shaft 88, clutch 94 and drive unit are thereafter assembled on the frame 82.

Operation

Since a primary purpose of the motor 100 and associated gear train is to eliminate the time and effort consumed during manual closing and opening of the valve, rather than to effect the full tight seating of large high pressure valves, the required motor is relatively small. In a high pressure valve equipped with this power unit, power operation will be used for accomplishing the large number of turns of the cross arm assembly necessary to move the valve element to a substantially seated position. At such a point in the valve closing operation, the torque required to move the valve closure element to a final seating position exceeds the clutch torque output and the clutch will slip. The manual impact imparting handwheel must be used to fully tightly seat the valve. Similarly the manual impact imparting handwheel is used to initially unseat the valve and the motor used to fully open it.

One of the important features of the invention which overcomes the difficulties previously associated with applying impact to a system including gearing is the provision for lost motion within the clutch. Actual tests revealed that in the absence of this feature the impact shock loads in the pinion-clutch-motor connection were undesirably severe and after several operations the shear pins 89, 119 failed and even 111 failed in shear. A consideration of the action of the power train during the instant of impact will illustrate how the lost motion connection prevents damage to the power train.

Initially, assuming the motor is running, the clutch slips, the ends of slots 131 and 131a in driven plates 129 and 129a, are urged against key 132 and the pinion gear teeth press against the ring gear teeth, in the direction, say, to close the valve. At the instant of impact, the cross-arm, and consequently the ring gear, suddenly acquire a velocity in the direction to close the valve, greater than that at which the motor is capable of driving it. Thus the ring gear teeth move away from the pinion teeth and, as soon as this movement takes up the backlash of the gear engagement, applies a driving torque to the pinion gear, which a moment before had been itself the driving member. At this instant the rotational velocity of the pinion, and all parts directly coupled to the pinion must be accelerated to a velocity equal to the ring gear velocity times the gear ratio.

Taking infinitesimal time increments into account, it is seen that in the absence of a lost motion connection the slipping of the clutch faces will stop, as the clutch housing accelerates causing loss of contact between the key and the driven plates 129 and 129a. A moment later, in a conventional clutch, the backlash of these key engagements is taken up and the clutch must again start slipping, this time in a direction reversed from the moment before. It is believed that this reversal develops an instantaneous abnormally high coefficient of friction because of the abrupt transition between the static and dynamic conditions at this clutch surface with the resulting component failures described above.

To alleviate this condition, the key slots 131, 131a in plates 129 and 129a are elongated as sectoral arcs to provide a lost-motion connection effective to permit the clutch housing to rotate independently of the clutch disks an amount equal to rotational motion derived from a handwheel impact. Thus the clutch housing is accelerated and the clutch slipping stops momentarily, but is not reversed because the reverse driving means does not become operative in the amount of rotational travel caused by impact. As the motion resulting from impact quickly diminishes and stops, the clutch plates follow along at the motor drive velocity, and soon re-engage and resume slipping in the original direction. Since velocities in this case are low, and the direction of slipping is not changed, no impact shock is involved and the friction remains normal.

Using the disclosed embodiment with sectoral keyslots and shear pins to protect the components as described, if the motor is stopped, and impact applied, the first impacts would take the up the protective lost motion which could then provide no further protection. The running motor drive thus serves not only to assist at the start of impact by supplying part of the break-out torque, but also and very importantly provides automatic take-up to restore the protective lost-motion after each impact. The two key slots 131, 131a in the driven plates are preferably of different length. This provides an additional measure of protection, since on any reversal of the clutch drive the break-out of the clutch friction surfaces will occur one at a time, rather than simultaneously, and the torque peaks will not be additive.

By providing the above-described lost motion connection the abnormally high instantaneous reversal load which is imposed on the pinion, clutch and motor shaft in a system having only normal backlash has been eliminated. As previously stated the invention is operative without such a lost motion structure but the shear pins would have to be "beefed-up" which would destroy their safety function and would very probably result in early failure of the components of the power unit that would then have to absorb the high impact loads during the time increment necessary for clutch reversal. Accordingly the disclosed clutch embodiment is the preferred embodiment.

The power train may also be protected from the damaging effect of high impact loads by incorporating the lost motion connection at other points in the system between the pinion 79 and the clutch surfaces. For example, the lost motion connection might be provided between the pinion 79 and the shaft 88 or between the shaft 88 and the clutch housing.

The most efficient and preferred method of using the present invention, to assure an extended trouble-free service life of the power components is to maintain operation of the motor after the clutch starts slipping and to use the manual impact imparting handwheel in conjunction with the frictional torque transmitted through the slipping clutch to fully tightly seat the valve. In this manner the number of manual impacting operations will be reduced. During closing movement of the valve by the power unit, the heavy impact imparting handwheel 58 will follow the rotation of the cross arm assembly 50 because the cross arms 52 and 54 engage the back faces of handwheel lugs 64 and 66. When the cross arm assembly stops its rotation upon slipping of the friction clutch, the inertia of handweel 58 causes it to continue rotation until the front faces of lugs 64 and 66 strike the cross arms 52 and 54, creating an automatic impact force helping to seat the valve.

As a corollary to the method of closing the valve the power unit should be energized in reverse when starting to open the valve. As the valve is tightly seated, the friction clutch will slip, but the torque being transmitted through the slipping clutch can be used together with manual impacting to initially unseat the valve whereupon the torque required to continue opening the valve is reduced, enabling the clutch to rotate the cross-arm assembly and fully open the valve.

It will thus be appreciated that a highly practical, compact, rugged, relatively low cost power unit is disclosed in combination with valve operators having an impact imparting handwheel to decrease the time and manual energy required for valve operation. The power unit is capable of use in conjunction with manual impacting operations for final valve seating and initial valve unseating, to greatly reduce the time and manual effort presently necessary for operation of such high pressure valves.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. A method of closing large valves provided with a rotatable valve operator comprising: the steps of applying a substantially constant torque to said valve operator in a valve closing direction to substantially close said valve and imparting a series of heavy impact forces on said valve operator in a valve closing direction while maintaining said substantially constant torque.

2. A method of opening large valves provided with a rotatable valve operator comprising: the steps of applying a substantially constant torque to said valve operator in a valve opening direction and imparting a series of heavy impact forces on said valve operator in a valve opening direction while maintaining said substantially constant torque.

3. A method of closing large high pressure valves wherein said valves are provided with a rotatable valve operator drivingly connected through a slip coupling to a rotatable motor unit comprising: the steps of operating said motor to rotate said valve operator in a valve closing position until said valve is in substantially closed position and said slip coupling no longer imparts positive movement to said valve operator, thereafter maintaining said power operator energized and imparting a series of heavy impact forces on said rotatable valve operator in a valve closing direction until the valve is fully tightly seated.

4. A method of opening high pressure valves wherein said valves are provided with a rotatable valve operator to which a rotatable motor unit is drivingly connected through a slip coupling comprising the steps of operating said motor to rotate said valve operator in a valve opening direction thereby exerting a substantially constant opening torque on said valve operator and thereafter maintaining said power operator energized and imparting a series of heavy impact forces on said rotatable valve operator in a valve opening direction until the torque exerted by said motor is sufficient to overcome the resistance to further movement of the valve operator in valve opening direction.

References Cited in the file of this patent
UNITED STATES PATENTS

| | | |
|---|---|---|
| Re. 20,471 | Kelty | Aug. 17, 1937 |
| 863,180 | Howard | Aug. 13, 1907 |
| 923,526 | Houser | June 1, 1909 |
| 1,181,053 | Anderson | Apr. 25, 1916 |
| 1,557,525 | Hanson | Oct. 13, 1925 |
| 1,731,314 | Mohr | Oct. 15, 1929 |
| 1,820,686 | Wise | Aug. 25, 1931 |
| 2,623,618 | Howard | Dec. 30, 1952 |